United States Patent

Englisch et al.

[11] Patent Number: 5,443,607
[45] Date of Patent: Aug. 22, 1995

[54] PROCESS FOR THE PRODUCTION OF A HOMOGENEOUS REAM-FREE BODY MADE OF QUARTZ GLASS

[75] Inventors: Wolfgang Englisch, Kelkheim; Heinrich Goy, Hasselroth; Paul Sauerwein; Peter Hitzschke, both of Rodenbach; Fritz Simmat, Gelnhausen; Rolf Takke, Hanau; Gerhard Steiner, Seligenstadt, all of Germany

[73] Assignee: Heraeus Quarzglas GmbH, Hanau, Germany

[21] Appl. No.: 170,925

[22] Filed: Dec. 21, 1993

[51] Int. Cl.[6] .................... C03B 23/04; C03B 20/00
[52] U.S. Cl. .......................... 65/64; 65/102; 65/111; 65/DIG. 8
[58] Field of Search ............ 65/64, 102, 111, 63, 65/108, 109, DIG. 8, 297

[56] References Cited

U.S. PATENT DOCUMENTS

| | | | |
|---|---|---|---|
| 3,128,169 | 4/1964 | Heraeus et al. | 65/111 |
| 4,358,306 | 11/1982 | Okamoto et al. | 65/32 |

FOREIGN PATENT DOCUMENTS

| | | |
|---|---|---|
| 567863 | 1/1933 | Germany . |
| 3201777A1 | 8/1983 | Germany . |

*Primary Examiner*—W. Gary Jones
*Assistant Examiner*—Steven P. Griffin
*Attorney, Agent, or Firm*—Finnegan, Henderson, Farabow, Garrett & Dunner

[57] ABSTRACT

A process for the production of homogeneous ream-free bodies made of quartz glass or made of a glass having a high content of silicic acid, in which an essentially bar-shaped initial body is twisted about its longitudinal axis in a shaping step to form a twisted body radially homogenized in layers having axial layering. To make it possible to produce homogeneous large-volume bodies, in at least one further shaping step the twisted body is then softened in a heatable mold under a force acting in the axial direction to deform it in a direction transverse to its axial direction into the mold and form a glass bar, the longitudinal axis of which extends essentially perpendicular to the layering. The glass bar is then twisted about its longitudinal axis.

13 Claims, 2 Drawing Sheets

PROCESS FOR THE PRODUCTION OF A HOMOGENEOUS REAM-FREE BODY MADE OF QUARTZ GLASS

BACKGROUND OF THE INVENTION

This invention relates to a process for the production of a homogeneous ream-free body made of quartz glass or made of a glass having a high content of silicic acid, by the shaping of an essentially bar-shaped initial body in a shaping step, the initial body being twisted about its longitudinal axis to form a twisted body radially homogenized in layers having axial layering.

A process of this kind is known from German Patent Specification 567,863. In the known process, a quartz-glass cylinder is held in a heating space between two bars fused to the cylinder ends and is twisted about its longitudinal axis as a result of relative movements of these bars in relation to one another. By the twisting of the cylinder, the glass mass is intermixed in the radial direction, and existing inhomogeneities, which can be detected, for example visually, as reams, are at the same time essentially removed. However, as seen in the direction of the cylinder axis, no intermixing takes place during the twisting, so that inhomogeneities along the cylinder axis persist. As a result of a twisting of this type, therefore, a kind of layered structure of reams is produced in the cylinder, the layers extending perpendicular to the cylinder axis and causing optical faults, depending on the direction in which the cylinder is subjected to stress. For the complete homogenization of the glass mass, the known process proposes kneading and agitation by means of fused-on bars until virtual freedom from reams is achieved.

By means of this process, homogeneous bodies made of quartz glass, having a weight of up to approximately 8 kg, can be produced. With an increasing weight of the glass mass, however, problems regarding the retention of glass mass by means of the bars and a sufficiently uniform heating of the body over its entire cross section also become increasingly evident. In particular, where heavy glass masses are concerned, pronounced mixing and shaping movements, such as occur, for example, during agitation and kneading, cannot be executed as a result of the mechanical stress on the points of fusion to the glass mass.

A process for the production of rods made of bubble-free quartz glass in a single-stage operation is known from German Offenlegungsschrift 3,201,777. In this process, a rod is drawn off continuously from a quartz-glass cylinder heated at one end, the cylinder and the rod being rotated in opposition about their longitudinal axis, and the glass mass being twisted in the heating zone. However, as a result of the absence of intermixing in the direction of the longitudinal axis, the production of quartz-glass bodies which are homogeneous and ream-free in all directions in space is not possible by means of this process.

U.S. Pat. Specification No. 4,358,306 describes a process for the forming of a quartz-glass block, in which an initial block is heated in a graphite mold, deformed by means of a pressure ram lowerable into the graphite mold, and subsequently cooled slowly. The cooling operation is intended to prevent reams or cracks from occurring. However, because of the absence of intensive intermixing of the quartz-glass mass, a completely homogeneous body, particularly ream-free over relatively long distances, cannot be produced by means of this process.

The object on which the present invention is based is to provide a cost-effective process for the production of homogeneous large-volume bodies made of quartz glass or made of a glass having a high content of silicic acid.

SUMMARY OF THE INVENTION

Proceeding from the process indicated in the introduction, the object is achieved, according to the invention, in that the formation of a glass bar, the longitudinal axis of which extends essentially perpendicular to the layering, comprises a shaping step, in which the twisted body is softened in a heatable mold and, under a force acting in the axial direction, is deformed in a direction transverse to the axial direction into the mold to form a glass body, and in that the glass bar is twisted about its longitudinal axis.

After the shaping step, in which the initial body is twisted about its longitudinal axis, there is an essentially cylindrical twisted body, in which no or only insignificant intermixing of the glass mass in the direction of the longitudinal axis has taken place. The twisted body is therefore inhomogeneous, as seen in the direction of the longitudinal axis, the inhomogeneities being visible, for example, as reams and occurring in the glass mass as inhomogeneity layers extending perpendicular to the axis of the twisted body or as layering extending in the direction of the longitudinal axis. Here, the expression "layer" is intended to denote a surface extension of an inhomogeneity, whereas "layering" is intended to denote the arrangement or sequence of the individual layers in the direction perpendicular to the layers. The formation of a glass bar, the longitudinal axis of which extends essentially perpendicular to the layering, ensures that, simply as a result of the twisting of the glass bar about its longitudinal axis, the inhomogeneity layers can be intermixed and at the same time essentially removed. Even where large-volume glass bars are concerned, the twisting can take place in the known way by means of opposed rotation of bars fused on at the ends of the softened glass bar.

Since the formation of the glass bar comprises a shaping step, in which the twisted body is softened in a heatable mold, a shaping of even very heavy masses is possible, in which case, after the shaping, the glass mass introduced into the mold fills the lower part of the mold. At the same time, the viscosity of the glass mass can also be set lower than would be possible in the known process for the homogenization of the glass mass by means of fused-on bars, so that an easier intermixing of the entire glass mass and therefore better homogenization are achieved. The use of a heatable mold for softening the glass mass to be shaped makes it possible to set a uniform temperature range over the entire glass mass to be shaped. Under a force acting in the axial direction, the twisted body is deformed in a direction transverse to the axial direction into the mold to form a glass body, in which the inhomogeneity layers are oriented, whilst their relative position in relation to one another and their layer sequence are largely preserved, although, as a result of the compression of the twisted body in the axial direction, the layer spacing occurring in the glass body is reduced in relation to that in the twisted body. This ensures that layers which are far removed from one another in the twisted body and which represent locally differing material properties lie close together in absolute terms in the glass body and are thereby more susceptible to subsequent intermixing. At the same time, for example, the bottom of the mold can serve as an abutment for the force acting during the deformation of the twisted body, the twisted body being softened there and, in the process, starting from one end, being deformed in the direction transverse to the axial direction. However, the same deformation is also achieved, for example, in that the twisted body is fed continuously to a heating zone, is softened there in a middle region of its length and, under a force acting in the axial direction, is deformed transversely to the axial direction into a mold arranged in the heating region, to form a glass body.

The twisting of the initial body and the twisting of the glass bar guarantee a good intermixing of regions of the glass mass originally far removed in the initial body, in two directions perpendicular to one another, with the result that a very good homogeneity of the quartz-glass body in all directions in space is achieved. If the requirements as to optical homogeneity are very strict, the process according to the invention can also be repeated with the glass bar as an initial body.

A process which has proved expedient especially for the production of very large, homogenous bodies comprises a shaping step, in which the glass body is produced in the form of a glass plate. The shaping of the glass mass of the twisted body requires long shaping times for a large volume of the glass mass. The shaping time can be reduced by increasing the softening temperature, but this then .increasingly entails evaporation losses of the glass mass, accompanied by chemical reactions of the glass with the mold material or by intensified abrasion of the mold by the glass mass flowing past the mold walls. The inhomogeneities caused thereby in the glass mass can be avoided or prevented by dividing the shaping step of shaping the twisted body into the glass bar into a plurality of smaller shaping steps, in which a glass plate is first produced from the twisted body and the glass bar is produced from this glass plate. For this purpose, the twisted body is, for example, softened upright in a mold, until, under the effect of a force acting in the axial direction, for example under the effect of the force of its own weight, it collapses on itself and at the same time is deformed into the mold in the direction transverse to the axial direction. To achieve a uniform temperature range within the glass mass to be shaped, the mold is preferably heated by an electrically heatable kiln surrounding it. With a view to a subsequent shaping step, in which a glass bar, the longitudinal axis of which extends essentially perpendicular to the layering, is formed, the glass plate is advantageously formed in such a way that, in it, the layers extend parallel to the large surface of the plate. The volume of the glass mass and the internal dimensions of the mold are, at the same time, advantageously coordinated with one another in such a way as to form a glass plate, the thickness of which is somewhat smaller than one or the lateral dimension of the glass bar to be formed.

In a further shaping step, the glass bar can be formed from the glass plate thus produced, by softening in a mold and under the effect of a force. At the same time, the glass plate is oriented in the mold in such a way that the glass bar is formed, the effective direction of the force being taking into account. As regards a glass plate in which the inhomogeneity layers run parallel to the surface, this means, for example, a compression in a direction parallel to the plate surface. In order largely to preserve the orientation of the inhomogeneity layers, the compression of the glass plate is advantageously carried out in such a way that the lengthening of another side of the glass plate which accompanies the compression takes place essentially only in one direction and/or its opposite direction. This is achieved in that the thickness of the glass plate is chosen only a little smaller than one lateral or the lateral dimension of the glass bar to be formed or somewhat smaller than the corresponding internal dimension of the mold for producing the glass bar.

It has proved particularly expedient, at the same time, to design the glass plate with a rectangular cross-section, as seen in the effective direction of the shaping force. Particularly the handling of large-volume glass plates and their further shaping to the glass bar to be formed are thereby simplified.

A process, in which the glass bar is formed in a single shaping step as a result of the shaping of the twisted body, is characterized by particular efficiency. The glass mass need to be heated only for the twisting and for the one shaping step. Furthermore, only one mold is required for shaping the twisted body into the glass bar.

A procedure, in which the shaping force comprises the force of gravity and/or a mechanically generated shaping force, is preferred. A shaping step, in which the glass mass collapses on itself under the effect of the force of gravity, solely as a result of its own weight, brings about a slow deformation and a uniform temperature distribution in the glass mass and thus prevents the formation of additional inhomogeneities during shaping. The shaping operation is accelerated by means of a shaping force additionally applied to the glass mass to be shaped and acting in the same direction as the force of gravity, for example an additional weight acting on the glass mass. In the event of deformation under an artificially generated shaping force, for example under a pressure applied to the glass mass from outside, the shaping of the glass mass can take place in any direction and the shaping speed can be controlled and, if necessary, accelerated by means of the amount of pressure applied. Moreover, a lower temperature can be chosen during the shaping step. Chemical and physical reactions possibly taking place between the mold material and the glass mass can thereby be prevented or reduced.

BRIEF DESCRIPTION OF THE DRAWINGS

The process according to the invention is described below by way of example with reference to a drawing. In the diagrammatically represented drawing.

DETAILED DESCRIPTION OF THE INVENTION

Figure 1:
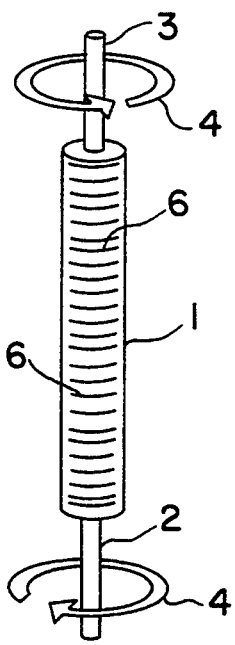
FIG. 1 shows the twisting of an initial body about its longitudinal axis to form a twisted body.

In FIG. 1, the reference numeral 1 denotes a cylindrical initial body having a weight of approximately 15 kg. As a result of opposed rotation of two pipes 2; 3 fused on at the cylinder ends, the initial body 1 is twisted about its longitudinal axis and, at the same time, the glass mass is mixed intensively in the radial direction to form a twisted body 5. The directions of rotation of the pipes 2, 3 are designated by the directional arrows 4. As a result of the intermixing of the glass-mass in the radial direction, inhomogeneities in this direction are largely removed. However, inhomogeneities which extend in the direction of the longitudinal axis of the initial body 1 cannot be eliminated in this way and remain visible in the twisted body 5 as ream layers 6, since no or only little intermixing of the glass mass takes place in this direction. The ream layers 6 extend here essentially perpendicular to the cylinder axis or the layering extends in the direction of the cylinder axis.

Figure 2:
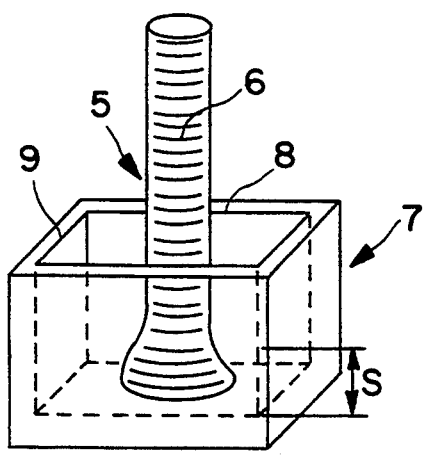
FIG. 2 shows a twisted initial body in a mold for producing a glass plate.
Figure 3:
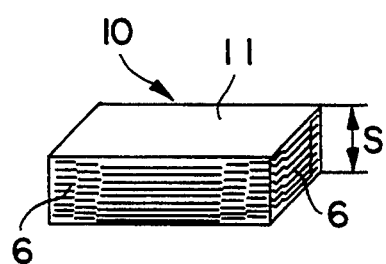
FIG. 3 shows a glass plate after extraction from the mold represented in FIG. 2.

FIG. 2 represents diagrammatically how the twisted body 5 is softened in a mold 7 and collapses on itself under its own weight. For the sake of clarity, the electrically heated kiln heating the mold 7 is not represented in the Figure. The volume of the glass mass of the twisted body 5 and the internal dimensions 8, 9 of the mold 7 are here designed so that the entire softened glass mass in the mold 7 exactly fills a layer having the thickness S, namely 110 mm, the internal dimensions 8; 9 of the mold 7 of 300 mm and 200 mm respectively being larger than the thickness S. After the glass mass has solidified, a glass plate 10, as represented in FIG. 3, is extracted form the mold 7. The glass plate 10 has external dimensions corresponding to the internal dimensions 8; 9 of the mold 7 and a thickness which, apart from a slight shrinkage, corresponds to the value S. Since there is scarcely any intermixing of the glass mass in the direction of the longitudinal axis even as a result of the shaping step of deforming the twisted body 5 into the glass plate 10, the ream layers 6 essentially remain in the glass plate 10, their orientation and their relative position in relation to one another being maintained. They extend therein generally parallel to the large plate surface 11.

Figure 4:
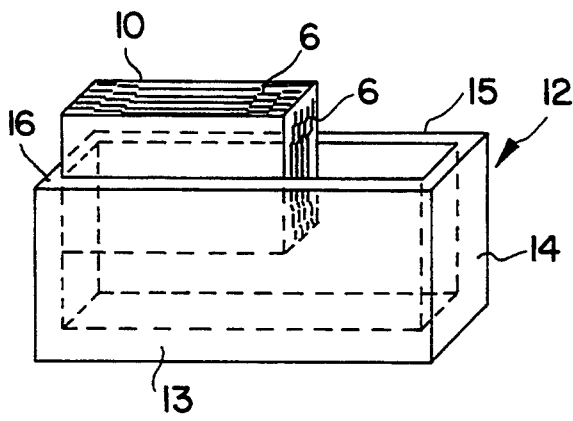
FIG. 4 shows the insertion of a glass plate according to FIG. 3 into a mold for forming a glass bar.

As represented in FIG. 4, the glass plate is softened at a temperature of approximately 1850° C. in a graphite mold 12, the side walls 13; 14; 15; 16 of which enclose a space of rectangular base area, the long side walls 13; 15 having a length of approximately 560 mm and maintaining a distance from one another which is somewhat larger than the thickness S of the glass plate 10. The glass plate 10 is placed preferably centrally in the graphite mold 12 and, at the same time, is oriented in the graphite mold 12 in such a way that the long side walls 13; 15 extend both parallel to the large plate surface 11 (FIG. 3) and parallel to the ream layers 6. Since the softening glass mass is deformed essentially in one direction or in the opposite direction thereto, namely parallel to the long side walls 13; 15, the ream layers 6 also maintain this orientation in the glass mass of the formed glass bar 17 (FIG. 5).

Figure 5:
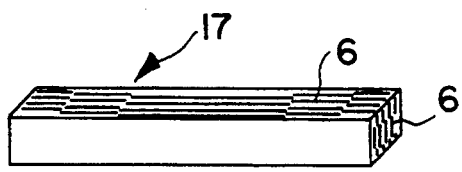
FIG. 5 shows a glass bar after extraction from the mold according to FIG. 4.

After solidification, a glass bar 17, as represented in FIG. 5, having an approximately square cross-section, as seen in the axial direction, and the dimensions 110 mm × 110 mm, can be extracted from the graphite mold 12. In this glass bar 17, the length and cross-sectional areas of which are comparable to the length and cross-sectional area of the initial body 1, the ream layers 6 now extend parallel to its longitudinal axis (or the layering of the reams extends perpendicular to the longitudinal axis). Thus they can easily be removed by twisting the glass bar 17 about the longitudinal axis. The body thus produced is homogeneous in three directions in space.

Figure 6:
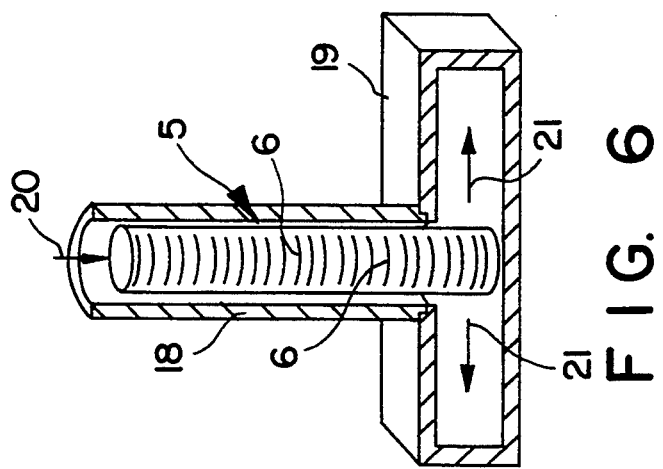
FIG. 6 shows a twisted body in a mold for forming a glass bar in one shaping step.

Reference was made to FIGS. 1 to 5 in order to explain by way of example a process, in which a deformation of a twisted body 5 to form a glass bar 17, in which the ream layers 6 extend parallel to the longitudinal axis, was carried out by means of an intermediate shaping step in which a glass plate 10 was formed. Starting from a twisted body 5, the same glass bar 17 can also be produced in only one shaping step. This process, which necessitates higher softening temperatures and longer shaping times on account of the higher shaping rates and more pronounced shaping movements, is explained by way of example in FIGS. 6 and 7. Thus, as shown in FIG. 6, the glass mass of a twisted body 5 is softened vertically upright in a graphite tube 18, the lower orifice of which opens into a bore of the casing of a second graphite tube 19 arranged perpendicular to the first graphite tube 18. The internal dimensions of the first graphite tube 18 are chosen so as to be only a little larger than the external dimensions of the twisted body 5. Under its own weight and under a weight force which additionally acts on the upper end face of the twisted body 5 and the effective direction of which is symbolized by the arrow 20, the twisted body 5 collapses on itself and is deformed essentially in a direction perpendicular to the longitudinal axis of the twisted body in respect of the glass mass, a glass rod 22 (FIG. 7) thereby being formed. The essential direction of deformation is represented in FIG. 6 by the directional arrows 21.

Figure 7:
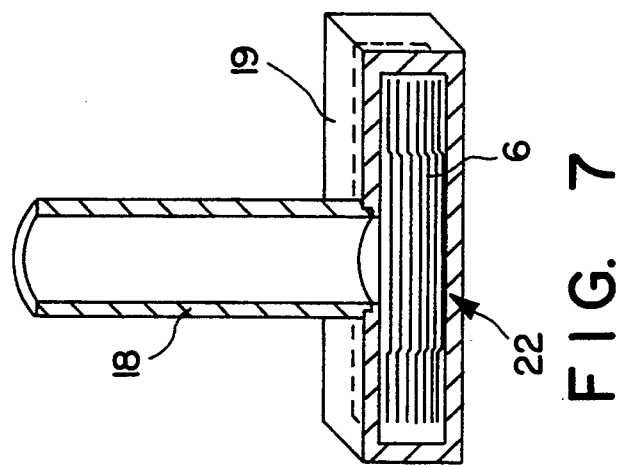
FIG. 7 shows the glass bar formed from the twisted body according to FIG. 6, in the mold according to FIG. 6.

After the complete shaping of the glass mass of the twisted body 5, the ream layers 6 lie essentially parallel to the longitudinal axis of the glass bar 22 thus formed, as represented diagrammatically in FIG. 7. The glass bar 22 is thereafter homogenized completely by being twisted about its longitudinal axis.

We claim:

1. A process for the production of a homogeneous ream-free body made of quartz glass or of a glass having a high content of silicic acid comprising twisting an essentially bar-shaped initial body of one of said glasses in a first shaping step about its longitudinal axis to form a twisted body radially homogenized in layers and having axially extending layering, softening the twisted body in a second shaping step in a heated mold under a force acting in the axial direction of the twisted body to deform the twisted body into the mold in a direction transverse to its axial direction and form a glass body having a longitudinal axis that extends essentially perpendicular to said layering, forming the glass body into a glass bar having a longitudinal axis that extends essentially perpendicular to said layering, and thereafter twisting the glass bar about its longitudinal axis to form said homogeneous ream-free body.

2. The process of claim 1, wherein the glass bar has an essentially square cross-sectional perpendicular to its longitudinal axis.

3. The process of claim 2, wherein the glass body formed in the mold is in the form of a glass plate.

4. The process of claim 3, wherein the glass plate has a thickness that corresponds essentially to one lateral dimension of the glass bar to be formed.

5. The process of claim 4, wherein the glass plate formed in the mold has a rectangular surface extending perpendicular to the direction of said force acting on said twisted body in said mold greater in both dimensions than said one lateral dimension of the glass bar to be formed.

6. The process of claim 1, wherein the force acting in the axial direction of the twisted body comprises the force of gravity.

7. The process of claim 1, wherein the force acting in the axial direction of the twisted body comprises a mechanically generated deforming force.

8. The process of claim 1, wherein the length and cross-sectional area of the glass bar are substantially the same as the length and cross-sectional area of the bar-shaped initial body.

9. A process for the production of a homogeneous ream-free body made of quartz glass or of a glass having a high content of silicic acid comprising twisting an essentially bar-shaped initial body of one of said glasses in a first shaping step about its longitudinal axis to form a twisted body radially homogenized in layers and having axially extending layering, softening the twisted body in a second shaping step in a heated mold under a force acting in the axial direction of the twisted body to deform the twisted body into the mold in a direction transverse to its axial direction and form a glass bar having a longitudinal axis that extends essentially perpendicular to said layering, and thereafter twisting the glass bar about its longitudinal axis to form said homogeneous ream-free body.

10. The process of claim 9, wherein the glass bar has an essentially square cross-section perpendicular to its longitudinal axis.

11. The process of claim 9, wherein the force acting in the axial direction of the twisted body comprises the force of gravity.

12. The process of claim 9, wherein the force acting in the axial direction of the twisted body comprises a mechanically generated deforming force.

13. The process of claim 9, wherein the length and cross-sectional area of the glass bar are substantially the same as the length and cross-sectional area of the bar-shaped initial body.

* * * * *